J. Corson.
Grain Sieve.
Nº 74313   Patented Feb. 11, 1868.
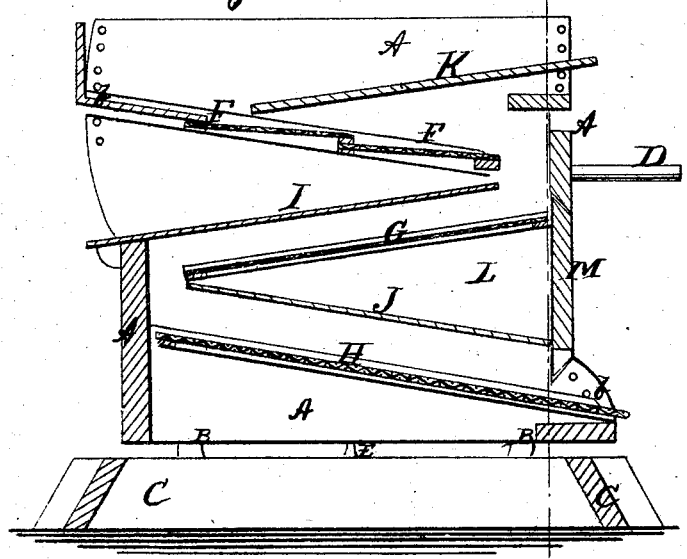
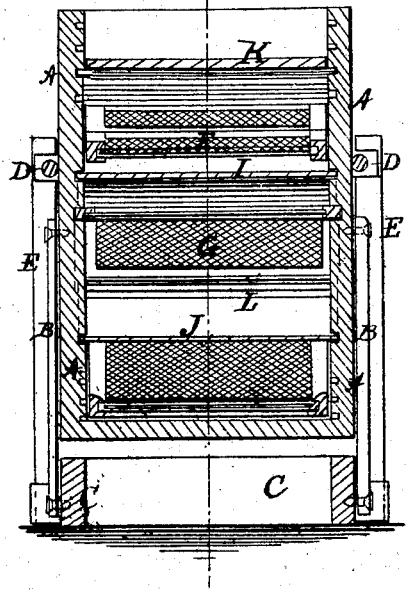
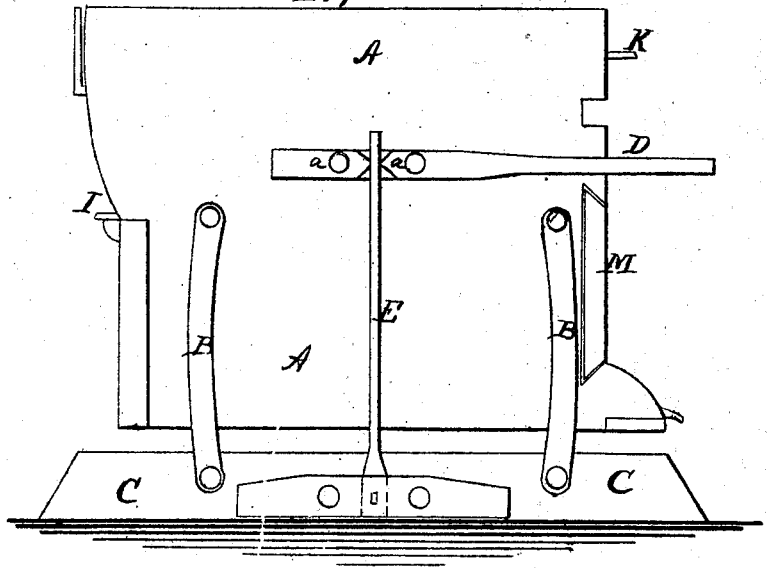
Witnesses.
W. C. Ashkettle
J. A. Fraser
Inventor.
J. Corson
per Munn & Co.
Attorneys

United States Patent Office.

JACOB CORSON, OF CLINTON, NEW JERSEY.

Letters Patent No. 74,313, dated February 11, 1868.

IMPROVEMENT IN GRAIN-SIEVE.

*The Schedule referred to in these Letters Patent and making part of the same.*

TO ALL WHOM IT MAY CONCERN:

Be it known that I, JACOB CORSON, of Clinton, in the county of Hunterdon, and State of New Jersey, have invented a new and improved Grain-Sieve; and I do hereby declare that the following is a full, clear, and exact description thereof, which will enable those skilled in the art to make and use the same, reference being had to the accompanying drawings, forming part of this specification, in which—

Figure 1 represents a longitudinal vertical section of my improved grain-sieve.
Figure 2 is a vertical transverse section of the same.
Figure 3 is a side elevation of the same.
Similar letters of reference indicate corresponding parts.

This invention relates to a new grain-sieve, which is so arranged that the grain may be most thoroughly separated from dust and dirt, and that the small grain may also be separated from the large grain.

The invention consists in the general arrangement of the sieves, whereby the desired result is obtained; also in the manner of securing the box that contains the sieves to a stationary frame, and of combining it with suitable springs, so that a shaking motion can be imparted to it by hand.

A, in the drawing, represents a box, of suitable size and material, hinged by means of four, or more or less, arms B B, to a pedestal, C, and provided with handles D D, as shown. From the pedestal project stiff springs E E, which fit with their free upper ends between lugs $a\ a$, that are arranged on the sides of the box A, as is clearly shown in fig. 3. The springs E have the tendency to remain straight, and to thereby keep the box A in a certain position. By moving the box by the handle D, a shaking motion will be imparted to it and its contents. Within the box A are arranged a number of sieves, F G H, in zigzag line, as shown in fig. 1. Below the upper sieves are arranged inclined boards I J, as shown, the same being about parallel with the sieves above them. The sieves are hinged to the box A at their upper or lower ends, so that their incline may be varied at pleasure, to cause the grain to move faster or slower over them, as may be desired. By means of pins $b$ fitting into set-holes arranged in the box A, the free ends of the sieves are supported in the required elevation. The grain to be sifted is thrown upon an inclined board, K, whence it falls upon the upper sieve F. Moving down on the same, the dust and dirt fall through the meshes of the sieve upon the board I, by which they are discharged from the box, while the grain falls over the lower edge of the sieve F, upon the upper part of the sieve G. On the sieve G the grain moves down, while impurities fall through the sieve upon the board J into a chamber, L, formed above the same. From the chamber L such impurities can only be removed by taking out a slide, M, arranged at the end of the box A, as is clearly shown in fig. 1. The grain falls from the sieve G upon the sieve H, by which the coarse grain is separated from the fine. The coarse grain is discharged from the lower end of the sieve H, while the fine passes through the sieve into a suitable receptacle below the same.

I claim as new, and desire to secure by Letters Patent—

1. A grain-sieve, consisting of the combination of the adjustable sieves F G H with the boards I and J, all made and operating substantially as herein shown and described.

2. The above in combination with the slide M, made as set forth.

3. The arrangement of the arms B, springs E E, and lugs $a\ a$ for connecting the box A, containing the sieves, with the pedestal C, so that a shaking motion can be easily imparted to the box A by hand or otherwise, as set forth.

JACOB CORSON.

Witnesses:
R. DUCKWORTH,
GEO. GULICK.